United States Patent
Chen (10) Patent No.: US 11,585,214 B2
(45) Date of Patent: Feb. 21, 2023

(54) METHOD AND SYSTEM FOR EXTRACTING RESERVOIR FLUID SAMPLE

(71) Applicant: HALLIBURTON ENERGY SERVICES, INC., Houston, TX (US)

(72) Inventor: Songhua Chen, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 74 days.

(21) Appl. No.: 17/146,874

(22) Filed: Jan. 12, 2021

(65) Prior Publication Data

US 2021/0131284 A1    May 6, 2021

Related U.S. Application Data (63) Continuation of application No. 16/332,503, filed as application No. PCT/US2016/056288 on Oct. 10, 2016, now Pat. No. 10,927,674.

(51) Int. Cl.
*E21B 49/10* (2006.01)
*E21B 49/08* (2006.01)
(Continued)

(52) U.S. Cl.
CPC ............. *E21B 49/10* (2013.01); *C09K 8/50* (2013.01); *E21B 49/088* (2013.01); *E21B 47/12* (2013.01);
(Continued)

(58) Field of Classification Search
CPC .............................. E21B 49/10; E21B 49/088
See application file for complete search history.

(56) References Cited

U.S. PATENT DOCUMENTS 5,269,180 A * 12/1993 Dave .................. E21B 49/088
                                                    73/152.52
5,602,334 A *  2/1997 Proett ................ E21B 49/008
                                                    73/152.05
(Continued)

FOREIGN PATENT DOCUMENTS

WO    2016085451 A1    6/2016

OTHER PUBLICATIONS

Bing Wei, Laura, Romero-Zeron, Denis Rodrigue; "Oil displacement mechanisms of viscoelastic polymers in enhanced oil recovery (EOR): a review," J Petrol Explor Prod Technol (2014) 4:113-121; DOI 10.1007/s 13202-0087-5; Accepted : Oct. 6, 2013; Published online: Oct. 23, 2013.
(Continued)

*Primary Examiner* — Catherine Loikith
(74) *Attorney, Agent, or Firm* — Polsinelli PC (57) ABSTRACT

A fluid extraction tool can include a body, a sealing pad extending from a portion of the elongated body, a container holding a selective permeability agent (SPA), and a device. The sealing pad can have an opening for establishing fluidic communication between an earth formation and the elongated body, an outer surface to hydraulically seal a region along an inner surface of a wellbore and a recess within the sealing pad establishing a fluid flow channel along the inner surface of the wellbore. The device can inject the SPA through an outlet of the body into the earth formation, and extract a formation fluid through the opening, wherein the formation fluid being collected is from the region along the inner surface of the wellbore sealed off by the sealing pad.

19 Claims, 6 Drawing Sheets

(51) Int. Cl.
*C09K 8/50* (2006.01)
*E21B 47/12* (2012.01)

(52) U.S. Cl.
CPC ......... *E21B 49/082* (2013.01); *E21B 49/0875* (2020.05)

(56) References Cited

U.S. PATENT DOCUMENTS

| | | | |
|---|---|---|---|
| 7,128,144 B2* | 10/2006 | Fox ........................ | E21B 49/10 166/264 |
| 7,182,136 B2 | 2/2007 | Dalrymple et al. | |
| 8,230,919 B2 | 7/2012 | Goodwin et al. | |
| 8,245,781 B2 | 8/2012 | Ciglenec et al. | |
| 8,555,969 B2 | 10/2013 | Goodwin et al. | |
| 8,692,547 B2 | 4/2014 | Chen et al. | |
| 9,410,406 B2* | 8/2016 | Yuan ........................ | E21B 43/26 |

OTHER PUBLICATIONS

Murad Mohammedahmed Abdulfarraj; :Numerical simulation of relative permeability modifier effect on oil and water production,; (2011) Masters Theses. Paper 5031; Missouri University of Science and Technology.

Halliburton product Marketing material (PE); Wells with OilPerm TM surfactants and formation fluid mobility modifiers (fMMs) performed 300% better than similar wells on 30-day cumulative oil production, Jun. 2015.

International Search Report and Written Opinion; PCT Application No. PCT/US2016/056288; dated Jun. 15, 2017.

\* cited by examiner

METHOD AND SYSTEM FOR EXTRACTING RESERVOIR FLUID SAMPLE

CROSS-REFERENCE TO RELATED APPLICATIONS

This application is a continuation of U.S. patent application Ser. No. 16/332,503, filed Mar. 12, 2019, which is a national stage entry of PCT application PCT/US2016/056288, filed Oct. 10, 2016, said applications are expressly incorporated herein in their entirety.

FIELD

The present disclosure relates generally to methods of retrieving and processing reservoir fluid samples. In particular, the subject matter herein generally relates to methods of extracting enhanced formation fluid samples.

BACKGROUND

Wellbores are drilled into the earth for a variety of purposes including tapping into hydrocarbon bearing formations to extract the hydrocarbons for use as fuel, lubricants, chemical production, and other purposes. The oil and gas industry typically conducts comprehensive evaluations of underground hydrocarbon reservoirs prior to wellbore development and production. Formation evaluation procedures generally involve the collection of formation fluid samples for hydrocarbon content analysis, an estimation of the formation permeability and directional uniformity, a determination of the formation fluid pressure, and various other analyses. Measurements of such parameters are typically performed using devices including, but not limited to, downhole formation testing tools.

Characteristics of the hydrocarbons within an earth formation can be determined using a formation mobility test performed in a downhole formation testing tool. Formation mobility is defined as permeability (k) divided by fluid viscosity ($\mu$). The governing equation of the orifice flow problem for mobility calculation is based on Darcy's equation, with the consideration of the geometry of the orifice opening of the downhole formation testing tool. The mobility calculation from formation tester measurements is well defined in a single fluid phase saturated porous rock regime. However, for multiphase flow the formation fluid mobility provides only an overall mobility which does not distinguish mobility of one fluid phase from another. Furthermore, fluid flow in fractured reservoir is dominated by the flow through fractures, the mobility of rock matrix is not easily determined.

To obtain a reservoir fluid sample for testing, a fluid extraction tool can be used to extract fluids from the formation at a desired depth. Extraction of a formation fluid can be a long and tedious process due to the need to pump out unwanted mud filtrates in order to obtain a clean, uncontaminated sample. Prolonged pumping processes are not uncommon, and obtaining a high quality sample is not guaranteed, especially in certain reservoir types. For example, samples obtained from depths located in transition zones, high-water-cut reservoirs, and fractured reservoirs, where the fractures are connected to water-bearing layers, the sample can show high water-contamination despite a prolonged pumping time.

Relative permeability modifiers have been used to reduce water production in high-water cut reservoirs, to maximize recovery from mature fields, and to reduce capillary pressure and enable rapid onset of gas production from tight earth formations. These agents reduce the effective permeability of water, without significantly affecting gas or oil permeability.

BRIEF DESCRIPTION OF THE DRAWINGS

Implementations of the present technology will now be described, by way of example only, with reference to the attached figures, wherein.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

In the above description, reference to up or down is made for purposes of description with "up," "upper," "upward," or "uphole" meaning toward the surface of the wellbore and with "down," "lower," "downward," or "downhole" meaning toward the terminal end of the well, regardless of the wellbore orientation. Correspondingly, the transverse, axial, lateral, longitudinal, radial, etc., orientations shall mean orientations relative to the orientation of the wellbore or tool. The term "axially" means substantially along a direction of the axis of the object. If not specified, the term axially is such that it refers to the longer axis of the object.

Several definitions that apply throughout the above disclosure will now be presented. The term "coupled" is defined as connected, whether directly or indirectly through intervening components, and is not necessarily limited to physical connections. The connection can be such that the objects are permanently connected or releasably connected. The term "outside," "outer," or "external" refers to a region that is beyond the outermost confines of a physical object.

The term "inside," "inner," or "internal" refers to a region that is within the outermost confines of a physical object. The terms "comprising," "including" and "having" are used interchangeably in this disclosure. The terms "comprising," "including" and "having" mean to include, but not necessarily be limited to the things so described.

Disclosed herein is a method for extracting samples of formation fluid at a predetermined depth. This is conducted by lowering a fluid extraction tool into a wellbore and injecting a selective permeability agent (SPA) into the formation. The SPA may include various agents such as relative permeability modifiers (RPMs) to prevent the flow of water and enhance the flow of hydrocarbons. After injecting the SPA into the formation, the fluid extraction tool can extract a sample of formation fluid from the earth formation, analyze the sample to determine the mobility for the formation fluid and/or collect the sample inside the fluid extraction tool. The fluid extraction tool may be coupled with a processor for carrying out the aforementioned steps and/or for determining mobility of hydrocarbons within the formation.

The apparatus, method and system disclosed herein can selectively reduce the water-relative permeability in-situ in order to increase the probability of obtaining a high quality, low-water-content sample in a shorter pumping time. In particular, the above allows for extraction of "cleaner" less contaminated formation hydrocarbon samples from the wellbore, more efficient extraction of such fluids and furthermore, determination of mobility of the hydrocarbon fluid phase in the formation.

Figure 1:
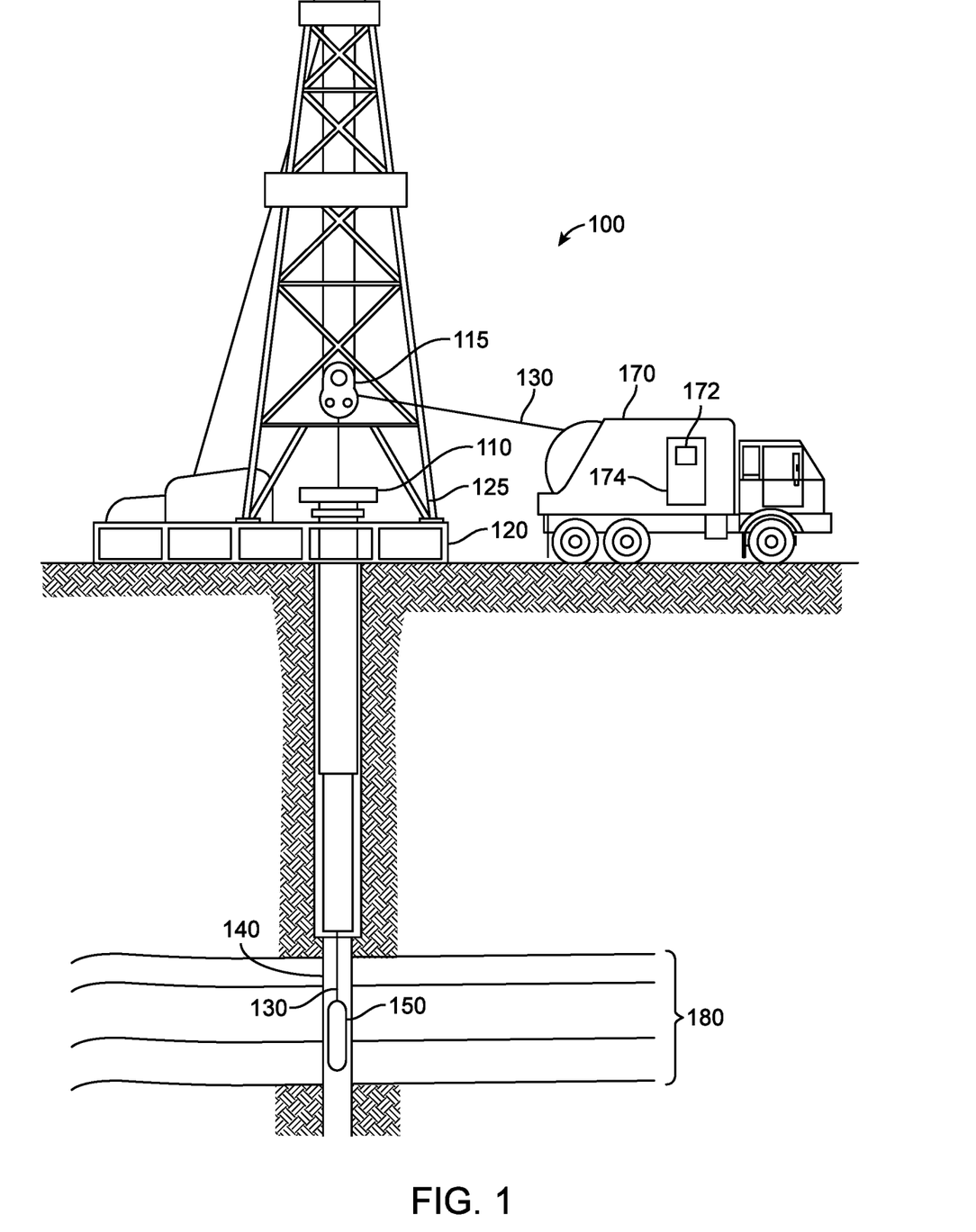
FIG. 1 is a diagram of a wellbore operating environment in which an apparatus, method, and system, having a fluid extraction tool, may be deployed, according to an exemplary embodiment.

FIG. 1 illustrates a system 100 according to various embodiments of the present disclosure. The fluid extraction tool 150 can be used as part of a wireline logging operation, or as part of a downhole drilling operation. For example, FIG. 1 shows a well during wireline logging operations. A drilling platform 120 may be equipped with a derrick 125 that supports a hoist 115. Drilling oil and gas wells can be carried out using a string of drill pipes connected together so as to form a drilling string that is lowered through a rotary table 110 into a wellbore 140, also referred to herein as borehole 140.

Here it is assumed that the drilling string has been temporarily removed from the wellbore 140 to allow a fluid extraction tool 150 to be lowered by conveyance 130 into the wellbore 140. The conveyance 130 can include any downhole conveyance such as wire, cable, e-line, slickline, braided line, metallic wire, non-metallic wire, or composite wire, single or multiple strands, as well as tubing, coiled tubing, joint tubing, pipe, or other tubular, combinations thereof, and the like. The fluid extraction tool 150 can be lowered to a desired location and stabilized within the wellbore 140. As the fluid extraction tool 150 is stabilized, instruments included in the fluid extraction tool 150 (e.g., a formation tester) may be used to perform measurements on formation fluid suspended within the earth formations 180 adjacent to the wellbore 140. The formation fluid data can be analyzed either within the fluid extraction tool 150 or transmitted to a logging facility 170 on the surface for storage, processing, and analysis. The logging facility 170 can be provided with electronic equipment for various types of fluid analysis. For example, the logging facility 170 may include one or more surface computers 172 and one or more displays 174. In the alternative, the data can be transmitted and processed off-site.

Although FIG. 1 depicts a vertical wellbore 140, the present disclosure is equally well-suited for use in wellbores having other orientations including horizontal wellbores, slanted wellbores, multilateral wellbores, or the like. It should be noted that while FIG. 1 generally depicts a land-based operation, those skilled in the art would readily recognize that the principles described herein are equally applicable to operations that employ floating or sea-based platforms and rigs, without departing from the scope of this disclosure.

Figure 2:
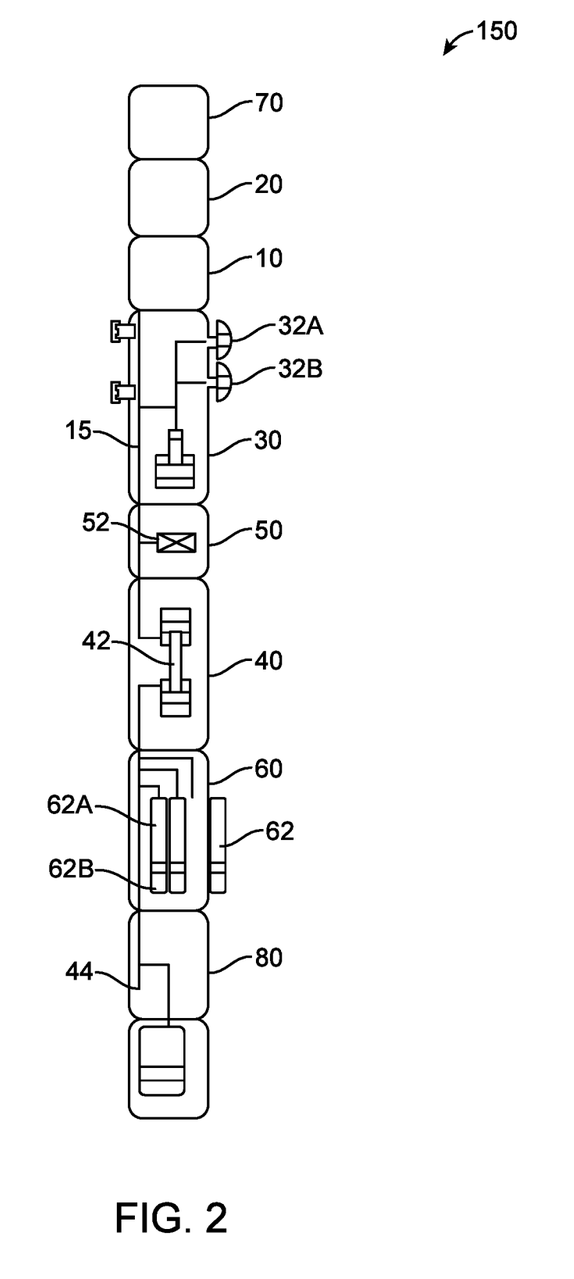
FIG. 2 is a diagram of a modular fluid extraction tool having a formation tester, according to an exemplary embodiment.

A variety of apparatuses and systems may be used to implement the activities described above. The system may be used with a modular downhole formation testing tool, including, but not limited to, the Reservoir Description Tool (RDT®) by Halliburton, the Modular Formation Dynamics Tester (MDT) by Schlumberger, or the Reservoir Characterization Instrument (RCI®) by Baker Hughes. As modified in accordance with the present disclosure, the tool is made suitable for testing, retrieval and sampling along sections of the earth formations by means of contact with the surface of a wellbore. In accordance with an exemplary embodiment illustrated in FIG. 2 the fluid extraction tool 150 may have an elongated body comprising several modules (sections) capable of performing various functions. As shown in FIG. 2, the fluid extraction tool 150 may include an injection device 10, a power module 20, for example, a hydraulic power module capable of converting electrical into hydraulic power; a formation tester 30 to take samples of the formation fluids; a flow control module 40 regulating the flow of various fluids in and out of the tool; a fluid test module 50 for performing different tests on a fluid sample; a multi-chamber sample collection module 60 that may contain various size chambers for storage of the collected fluid samples; a telemetry module 70 that provides electrical and data communication between the modules; and an uphole control unit (not shown) and other sections, designated in FIG. 2 collectively as 80. One of skill in the art would readily recognize that the various modules can be rearranged depending on the specific applications, and that the arrangement herein should not be considered as limiting.

More specifically, the power telemetry section 70 conditions power for the remaining tool sections. Each section can have its own process-control system and can function independently. While section 70 provides a common intra-tool power bus, the entire tool string (extensions beyond fluid extraction tool 150 not shown) shares a common communication bus that is compatible with other logging tools. This arrangement enables the tool in a preferred embodiment to be combined with other logging systems, including, but not limited to, a Magnetic Resonance Image Logging (MRIL) or High-Resolution Array Induction (HRAI) logging systems.

Fluid extraction tool 150 can be conveyed into the wellbore 140 by conveyance 130 (as shown in FIG. 1), which contains conductors for carrying power to the various components of the tool and conductors or cables (coaxial or fiber optic cables) for providing two-way data communication between the fluid extraction tool 150 and the logging facility 170 (as shown in FIG. 1). The logging facility 170, as described above, preferably comprises a computer and associated memory for storing programs and data. The logging facility 170 generally controls the operation of fluid extraction tool 150 and process data received during operations. The logging facility 170 can include, but is not limited to, a variety of associated peripherals, such as a recorder for recording data, a display for displaying desired information, and a printer. In a specific embodiment, telemetry module 70 may provide both electrical and data communications between the modules and the logging facility 170 (as shown in FIG. 1). In particular, telemetry module 70 provides high-speed data bus from the control unit to the modules to download sensor readings and upload control instructions initiating or ending various test cycles and adjusting different parameters, such as the rates at which various pumps are operating.

The injection device 10 and/or formation tester 30 may inject a SPA from the sampling tool 150 into the area of the wellbore and formation where mobility testing or sampling is desired. The SPA can be injected into the earth formation in the vicinity of the formation tester 30, prior to the extraction of any formation fluid. The amount of SPA necessary for fluid extraction may be low and therefore may not require mixing with the drilling fluid. Therefore the injection of the SPA can be focused on the sample area. Alternatively, the SPA can be dispersed in the drilling mud. As known in the art, formation fluid sampling can be conducted while drilling. For efficient sampling while drilling, the injection of the material can occur before collection of the samples, or, in the alternative, the sampling can occur after a predetermined period of time, allowing time for the material to absorb water, crosslink, and segregate fluid phases within the rock prior to extraction. Additionally, the material can be injected during the drilling operations as samples are being collected.

During wireline operations, the injection and analysis can occur during the same logging pass or a different logging pass. For example, the injection can be made and the sample collected while the tool is stationary, or, in the alternative the injection can be performed during the down-logging pass and the sampling and testing can be conducted during the up-logging pass, allowing the permeability modifier time to disperse and crosslink to the water molecules.

The flow control module 40 of the fluid extraction tool 150 can include a double acting piston pump 42, which can control the formation fluid flow from the earth formation drawn into probes 32A and 32B. Formation fluid which is drawn in via probes 32A and 32B may be taken into line 15 for mobility testing within fluid testing section 50 and/or provided to sample collection module 60. The extracted fluid can be referred to herein as a fluid sample whether used for fluid mobility testing or collection in sample collection module 60. The pump 42 is reversible such that in addition to drawing fluid from the formation, it can also be used to inject SPA from probes 32A and 32B or injection device 10 into the formation. Alternatively multiple pumps may be used, for example one pump may be employed for drawing in fluid on the one hand and separate second pump provided for injecting the SPA on the other. The pump operation can be monitored by the logging facility 170.

Fluid entering the probes 32A and 32B flows through flow line 15 and can also be discharged into the wellbore 140 via outlet 44. A fluid control device, such as a control valve, can be connected to flow line 15 to control the expulsion of discharged fluid from the flow line 15. Flow control module 40 may additionally include one or more flow rate sensors and/or pressure sensors such as strain-gauge pressure transducers that can measure flow rate and/or inlet and outlet pump pressures.

In order to test the mobility of the fluid drawn from the formation, the fluid testing section 50 of the tool can include a fluid testing device, which can analyze the fluid flowing through flow line 15. For the purpose of this example, any suitable device or devices can be utilized to analyze the fluid mobility of the formation. In the case at hand, due to the injection of a SPA into the formation, the flow of water in the formation should be prevented or reduced, while on the other hand, the flow of hydrocarbon is respectively enhanced. Accordingly, the mobility of the hydrocarbon phase is fluid which is tested as disclosed herein. These devices for determining fluid mobility may include, but are not limited to, pressure transducers such as quartz pressure crystal pressure transducer, such as a Quartzdyne® pressure gauge. For example Halliburton's Single Gauge quartz Pressure tool may be employed. Additionally, devices may be employed which include a number of sensors or quartz gauges. For example, in such gauge carriers the pressure resonator, temperature compensation, and reference crystal are packaged as a single unit with each adjacent crystal in direct contact. The assembly can be contained in an oil bath that is hydraulically coupled with the pressure being measured. The quartz gauge enables the device to obtain a measurement of parameters such as the drawdown pressure of fluid being withdrawn from the earth formation and the fluid temperature. In at least one instance, two fluid testing devices 52 can be run in tandem to obtain the pressure difference between and determine the viscosity of the fluid while pumping is in process or the density of the fluid once flow is stopped. Flow rate sensors can also be employed to determine the flow rate of the fluid being extracted to determine mobility of hydrocarbon in the formation. Both flow rate sensors and pressure sensors can both be employed.

Sample collection module 60 of the tool may contain chambers of various sizes for storage of the collected fluid sample. Sample collection module 60 can include at least one collection tube 62 and can additionally include a piston that divides collection tube 62 into a top chamber 62A and a bottom chamber 62B. A conduit can be coupled with bottom chamber 62B to provide fluid communication between bottom chamber 62B and the outside environment, such as the inner surface of the wellbore. Additionally, a fluid flow control device, such as an electrically controlled valve, can be placed in the conduit to selectively open and close the valve to allow fluid communication between the bottom chamber 62B and the wellbore. Similarly, chamber section 62 may also contain a fluid flow control device, such as an electrically operated control valve, which is selectively opened and closed to direct the formation fluid from the flow line 15 into the upper chamber 62A.

Formation tester 30, specifically probe 32, can have electrical and mechanical components that can facilitate testing, sampling, and extraction of fluids from the earth formation. The probe 32 can be laterally extendable by one or more actuators inside the formation tester 30 to extend the probe 32 away from the tool. Formation tester 30 can retrieve and sample formation fluids throughout an earth formation along the longitudinal axis of the wellbore. In accordance with the disclosure an extendable probe 32 is provided coupled with at least one sealing pad providing a sealing contact with the inside surface of the wellbore at a desired location. Probe 32 can additionally include one or more high-resolution temperature compensated strain gauge pressure transducers (not shown), that can be isolated with shut-in valves to monitor probe pressure. Fluids from the sealed-off part of the earth formation may be collected through one or more slits, fluid flow channels, openings, outlets or recesses in the sealing pad. As discussed further with respect to FIG. 3B, the recesses, in the pad can be elongated along the axis of the pad. In at least one embodiment, the formation tester 30 is as further illustrated in FIGS. 3A and 3B. While FIG. 3A illustrates a formation tester 30 with a single probe, it would be understood by those in the art that any number of probes may be used without diverging from the scope of this description.

Figure 3A:
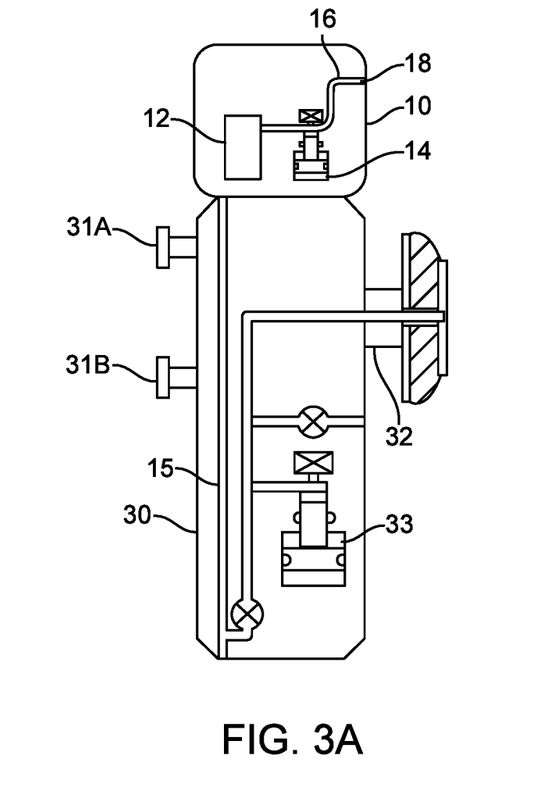
FIG. 3A is a diagram of a formation tester module, according to an exemplary embodiment.

FIG. 3A illustrates a portion of the fluid extraction tool 150, including the injection device 10 and the formation tester 30. FIG. 3A shows extendable supports 31A, 31B located opposite the probe 32 of the formation tester 30. Extendable supports 31A, 31B are laterally movable by actuators placed inside the formation tester 30 to extend away from the tool. While FIG. 3A illustrates a formation tester 30 with two extendable supports, it would be understood by those in the art that any number of extendable supports may be used without diverging from the scope of this description. Additionally, while FIG. 3A shows that the extendable supports that extend in the opposite direction of the probe 32, it would be understood by those of skill in the art that the supports could extend in any direction.

The pump 33 can be used to perform analysis on a small volume sample of formation fluid. The pump 33 can be, but is not limited to, a piston pump. Pump 33 can have a high-resolution, strain-gauge pressure transducer, similar to that described with respect to the probe, which can be isolated from the intra-tool flow line 15 and probe 32. Additionally, the module may include a resistance, optical, or other type of cell (not shown) located near probe 32 which can monitor fluid properties as fluid enters the probe 32.

The pump 33 can also be used to inject selectively permeable agent through an outlet in probe 32 into the formation. A chamber 12 can be provided for holding a SPA. For example, the SPA can be drawn from the chamber 12 and injected through the probe 32 into the formation. Alternatively, pump 42 (as shown in FIG. 2) or other pumps may be employed for injecting the selectively permeable agent through probe 32. The SPA injected into the annulus or formation via an outlet or other opening in the probe 32. The opening through which fluid is extracted may also serve as an outlet through which selectively permeable agent is injected (or expelled) to the formation.

Figure 3B:
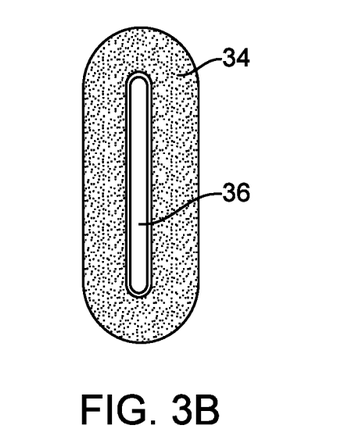
FIG. 3B is a front view of the sealing pad of a formation tester, according to an exemplary embodiment.

As shown in FIG. 3A, and illustrated in further detail in FIG. 3B, a sealing pad 34 can be coupled with the probe 32 and is capable of sealing off a portion of the wellbore. Sealing pad 34 can be permanently coupled or removably attached to the probe 32. FIG. 3B illustrates a front view of the sealing pad 34 and the recess 36. Although not illustrated, one of skill in the art would understand that an array of sealing pads 34 may be used with different angular deployment with respect to the wellbore (for example, diagonally opposite, or placed at various angles with respect to the probe).

In alternative embodiments, design flexibility can be provided using redundancy schemes, in which sealing pads of various sizes and properties can be attached to any number of extension elements or probes, and can use various combinations of screens, filtering packs, and any other suitable filtering means. As described above, alternative designs can be used interchangeably with the specific designs illustrated in this disclosure.

As noted previously, the probes 32A and 32B may be employed for injecting SPA into the formation. Alternatively, a separate injection device 10 may be employed. Referring back to FIG. 3A, an injection device 10 is shown coupled with the formation tester 30. The injection device 10 can include a chamber 12B for holding a SPA, a pump 14, a fluid flow line 16, and an outlet 18. The outlet 18 serves as an opening through which the SPA is pumped and injected into the earth formation.

The SPA is any agent which selectively modifies the permeability of certain fluids, and in the illustrative instance, blocks or reduces the flow of water while permitting or enhancing the flow of formation hydrocarbons. For purposes of the present disclosure, SPA may include, but are not limited to, relative permeability modifiers (RPM) disproportionate permeability reducers (DPR), or formation fluid mobility modifiers (FFMM), and the like. For example, such materials can improve the fluid extraction process in a variety of ways including, but not limited to, segregate flow pathways between oil and water, shrink when in contact with oil and swell when in contact with water, and absorb in the pore walls of the earth formation.

Additionally, the fluid extraction tool 150 along with the SPA described herein can also be used for: (1) improving efficiency and effectiveness in formation testing, (2) collecting high-quality hydrocarbon liquid samples and reducing pump time in multiphase system, (3) assessing formation matrix mobility from fracture mobility in fractured formations, or (4) obtaining near-single phase hydrocarbon mobility and effective permeability in reservoir depths were high water contamination samples are produced. When the material is injected into the wellbore, the injection pressure can be, but does not have to be, higher than the extraction pressure.

SPAs can include polymers and gels which swell in the presence of water. The SPA may include super absorbent polymer gel which may be crosslinkable. The expansion has the effect of reducing the available cross-sectional flow area for the fluid flow channel, which selectively increases resistance to a particular fluid such as water flow.

Suitable RPMs known in the art may be employed, and which may include a hydrophilic polymer, for example cationic or anionic, or zwitterionic polymers. Particular exemplary relative permeability modifiers include polyacrylamides, such as partially hydrolyzable polyacrylamides, and copolymers of polyacrylamides with acids such as acrylic acid. These polymers may also be cross-linkable. Cross-linking agents may also be provided, such as compounds or complexes which provide multivalent, and at least trivalent metal ions. For example, cross-linking agents may include compounds or complexes having metals, transition metals, post-transition metals, and in particular having aluminum, chromium, zirconium, as well ions of the aforementioned, and mixtures thereof. Relative permeability modifiers may be used in conjunction with a substrate. In one application, the polymer may be bonded to individual particles of a substrate. Example substrate materials include sand, gravel, metal balls, ceramic particles, and inorganic particles, nano-particles of the aforementioned, or any other material that is stable in a down-hole environment. Materials that may function as relative permeability modifiers are described in for example U.S. Pat. Nos. 6,474,413, 7,084,094, 7,159,656, and 7,395,858. An exemplary modifier may be the chemical formula employed by WaterWeb® service by Halliburton Energy Services, Inc. An exemplary FFMM may include OilPerm™ FFMM by Halliburton Energy Services, Inc.

Figure 4A:
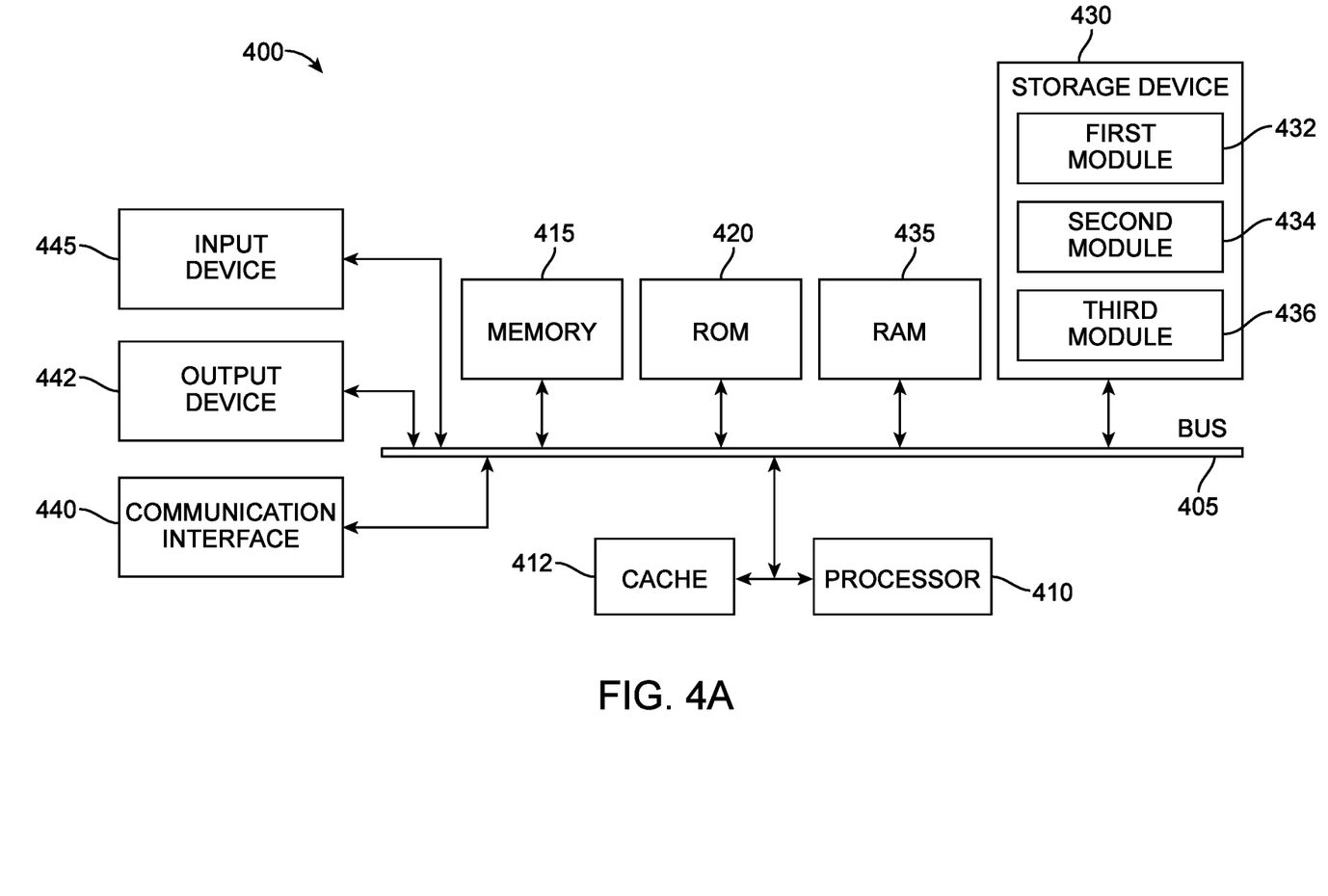
FIG. 4A is an illustration depicting a conventional system bus computing system architecture, according to an exemplary embodiment.
Figure 4B:
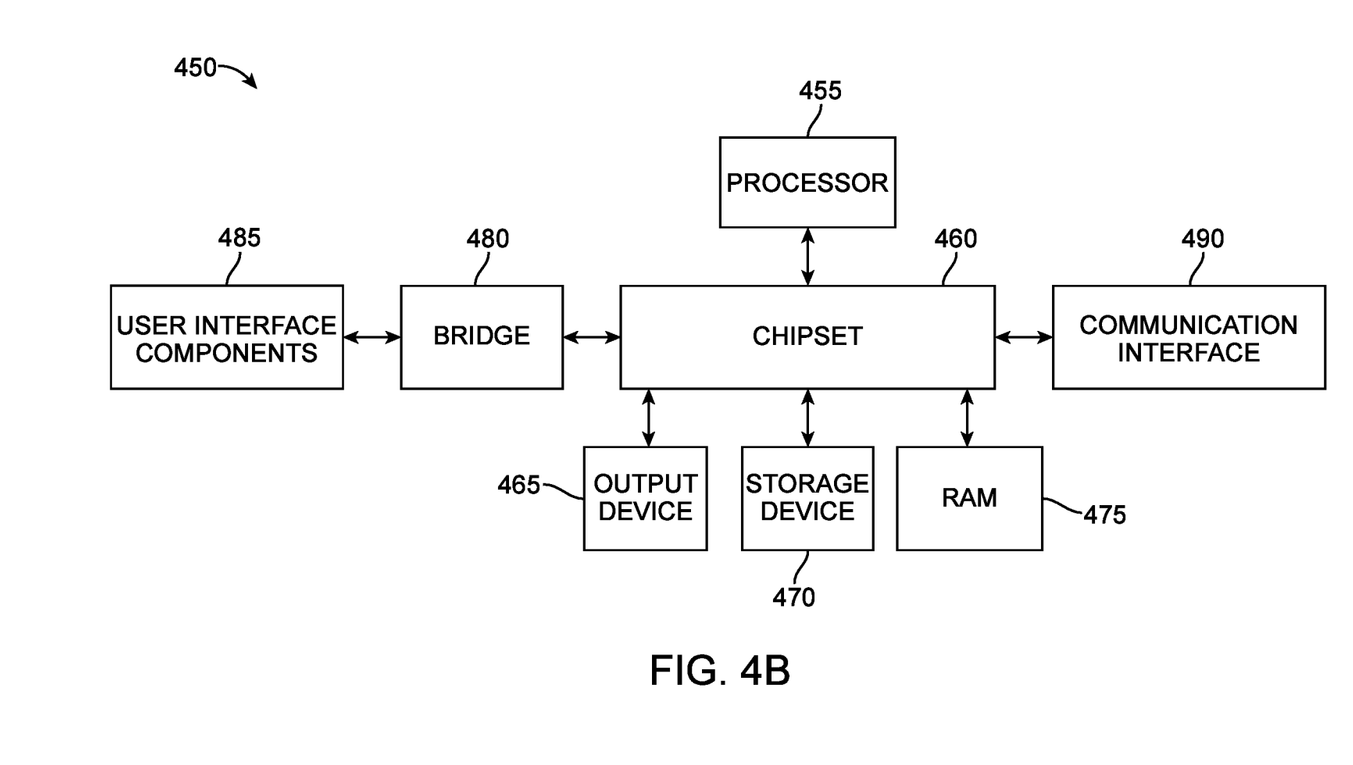
FIG. 4B is an illustration depicting a computer system having a chipset architecture, according to an exemplary embodiment.

The sampling tool 150 and any of its devices or modules may include one or more suitable computer, controller, or processors capable of being programmed to carry out the method, system, and apparatus as further described herein. This includes the operation of any pumps, the extraction of fluids from the formation and/or injection of SPAs, or direction of fluid within the devices and lines within the sampling tool 150. FIGS. 4A and 4B illustrate exemplary computing units and/or processors which can be employed to practice the concepts, methods, and techniques disclosed herein. The more appropriate embodiment will be apparent to those of ordinary skill in the art when practicing the present technology. Persons of ordinary skill in the art will also readily appreciate that other system embodiments are possible.

FIG. 4A illustrates a conventional system bus computing system architecture 400 wherein the components of the system are in electrical communication with each other using a bus 405. System 400 can include a processing unit (CPU or processor) 410 and a system bus 405 that couples various system components including the system memory 415, such as read only memory (ROM) 420 and random access memory (RAM) 435, to the processor 410. The system 400 can include a cache of high-speed memory connected directly with, in close proximity to, or integrated as part of the processor 410. The system 400 can copy data from the memory 415 and/or the storage device 430 to the cache 412 for quick access by the processor 410. In this way, the cache 412 can provide a performance boost that avoids processor 410 delays while waiting for data. These and other modules can control or be configured to control the processor 410 to perform various actions. Other system memory 415 may be available for use as well. The memory 415 can include multiple different types of memory with different performance characteristics. It can be appreciated that the disclosure may operate on a computing device 400 with more than one processor 410 or on a group or cluster of computing devices networked together to provide greater processing capability. The processor 410 can include any general purpose processor and a hardware module or software module, such as first module 432, second module 434, and third module 436 stored in storage device 430, configured to control the processor 410 as well as a special-purpose processor where software instructions are incorporated into the actual processor design. The processor 410 may essentially be a completely self-contained computing system, containing multiple cores or processors, a bus, memory controller, cache, etc. A multi-core processor may be symmetric or asymmetric.

The system bus 405 may be any of several types of bus structures including a memory bus or a memory controller, a peripheral bus, and a local bus using any of a variety of bus architectures. A basic input/output (BIOS) stored in ROM 420 or the like, may provide the basic routine that helps to transfer information between elements within the computing device 400, such as during start-up. The computing device 400 further includes storage devices 430 or computer-readable storage media such as a hard disk drive, a magnetic disk drive, an optical disk drive, tape drive, solid-state drive, RAM drive, removable storage device, a redundant array of inexpensive disks (RAID), hybrid storage device, or the like. The storage device 430 can include software modules 432, 434, 436 for controlling the processor 410. The system 400 can include other hardware or software modules. The storage device 430 is connected to the system bus 405 by a drive interface. The drives and the associated computer-readable storage devices provide non-volatile storage of computer-readable instructions, data structures, program modules and other data for the computing device 400. In one aspect, a hardware module that performs a particular function includes the software components shorted in the tangible computer-readable storage device in connection with the necessary hardware components, such as the processor 410, bus 405, and so forth, to carry out a particular function. In the alternative, the system can use a processor and computer-readable storage device to store instructions which, when executed by the processor, cause the processor to perform operations, a method, or other specific actions. The basic components and appropriate variations can be modified depending on the type of device, such as whether the device 400 is a small, handheld computing device, a desktop computer, or a computer server. When the processor 410 executes instructions to perform "operations", the processor 410 can perform the operations directly and/or facilitate, direct, or cooperate with another device or component to perform the operations.

To enable user interaction with the computing device 400, an input device 445 can represent any number of input mechanisms, such as a microphone for speech, a touch-sensitive screen for gesture or graphical input, keyboard, mouse, motion input, speech and so forth. An output device 442 can also be one or more of a number of output mechanisms known to those of skill in the art. In some instances, multimodal systems can enable a user to provide multiple types of input to communicate with the computing device 400. The communications interface 440 can generally govern and manage the user input and system output. There is no restriction on operating on any particular hardware arrangement and therefore the basic features here may easily be substituted for improved hardware or firmware arrangements as they are developed.

Storage device 430 is a non-volatile memory and can be a hard disk or other types of computer readable media which can store data that are accessible by a computer, such as magnetic cassettes, flash memory cards, solid state memory devices, digital versatile disks (DVDs), cartridges, RAMs 425, ROM 420, a cable containing a bit stream, and hybrids thereof.

The logical operations for carrying out the disclosure herein may include: (1) a sequence of computer implemented steps, operations, or procedures running on a programmable circuit with a general use computer, (2) a sequence of computer implemented steps, operations, or procedures running on a specific-use programmable circuit; and/or (3) interconnected machine modules or program engines within the programmable circuits. The system 400 shown in FIG. 4A can practice all or part of the recited methods, can be a part of the recited systems, and/or can operate according to instructions in the recited tangible computer-readable storage devices.

One or more parts of the example computing device 400, up to and including the entire computing device 400, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include on or more of a virtual machine, an overlay network, a hypervisor, virtual switching, and any other virtualization application.

The processor 410 can include all types of processors disclosed herein, including a virtual processor. However, when referring to a virtual processor, the processor 410 includes the software components associated with executing the virtual processor in a virtualization layer and underlying hardware necessary to execute the virtualization layer. The system 400 can include a physical or virtual processor 410 that receives instructions stored in a computer-readable storage device, which causes the processor 410 to perform certain operations. When referring to a virtual processor 410, the system also includes the underlying physical hardware executing the virtual processor 410.

FIG. 4B illustrates an example computer system 450 having a chipset architecture that can be used in executing the described method and generating and displaying a graphical user interface (GUI). Computer system 450 can be computer hardware, software, and firmware that can be used to implement the disclosed technology. System 450 can include a processor 455, representative of any number of physically and/or logically distinct resources capable of executing software, firmware, and hardware configured to perform identified computations. Processor 455 can communicate with a chipset 460 that can control input to and output from processor 455. Chipset 460 can output information to output device 465, such as a display, and can read and write information to storage device 470, which can include magnetic media, and solid state media. Chipset 460 can also read data from and write data to RAM 475. A bridge 480 for interfacing with a variety of user interface components 485 can include a keyboard, a microphone, touch detection and processing circuitry, and pointing device, such as a mouse, and so on. In general, inputs to system 450 can come from any of a variety of sources, machine generated and/or human generated.

Chipset 460 can also interface with one or more communication interfaces 490 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 455 analyzing data stored in storage 470 or RAM 475. Further, the machine can receive inputs from a user via user interface components 485 and execute appropriate functions, such as browsing functions by interpreting these inputs using processor 455.

It can be appreciated that systems 400 and 450 can have more than one processor 410, 455 or be part of a group or cluster of computing devices networked together to provide processing capability. For example, the processor 410, 455 can include multiple processors, such as a system having multiple, physically separate processors in different sockets, or a system having multiple processor cores on a single physical chip. Similarly, the processor 410 can include multiple distributed processors located in multiple separate computing devices, but working together such as via a communications network. Multiple processors or processor cores can share resources such as memory 415 or the cache 412, or can operate using independent resources. The processor 410 can include one or more of a state machine, an application specific integrated circuit (ASIC), or a programmable gate array (PGA) including a field PGA.

Methods according to the aforementioned description can be implemented using computer-executable instructions that are stored or otherwise available from computer readable media. Such instructions can comprise instructions and data which cause or otherwise configured a general purpose computer, special purpose computer, or special purpose processing device to perform a certain function or group of functions. Portions of computer resources used can be accessible over a network. The computer executable instructions may be binaries, intermediate format instructions such as assembly language, firmware, or source code. Computer-readable media that may be used to store instructions, information used, and/or information created during methods according to the aforementioned description include magnetic or optical disks, flash memory, USB devices provided with non-volatile memory, networked storage devices, and so on.

For clarity of explanation, in some instances the present technology may be presented as including individual functional blocks including functional blocks comprising devices, device components, steps or routines in a method embodied in software, or combinations of hardware and software. The functions these blocks represent may be provided through the use of either shared or dedicated hardware, including, but not limited to, hardware capable of executing software and hardware, such as a processor 410, that is purpose-built to operate as an equivalent to software executing on a general purpose processor. For example, the functions of one or more processors represented in FIG. 4A may be provided by a single shared processor or multiple processors (use of the term "processor" should not be construed to refer exclusively to hardware capable of executing software). Illustrative embodiments may include microprocessor and/or digital signal processor (DSP) hardware, ROM 420 for storing software performing the operations described below, and RAM 435 for storing results. Very large scale integration (VLSI) hardware embodiments, as well as custom VLSI circuitry in combination with a general purpose DSP circuit, may also be provided.

The computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing methods according to these disclosures can comprise hardware, firmware and/or software, and can take any of a variety of form factors. Such form factors can include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in the single device.

The instructions, media for conveying such instructions, computing resources for executing them, and other structures for supporting such computing resources are means for providing the functions described in the present disclosure.

Figure 5:
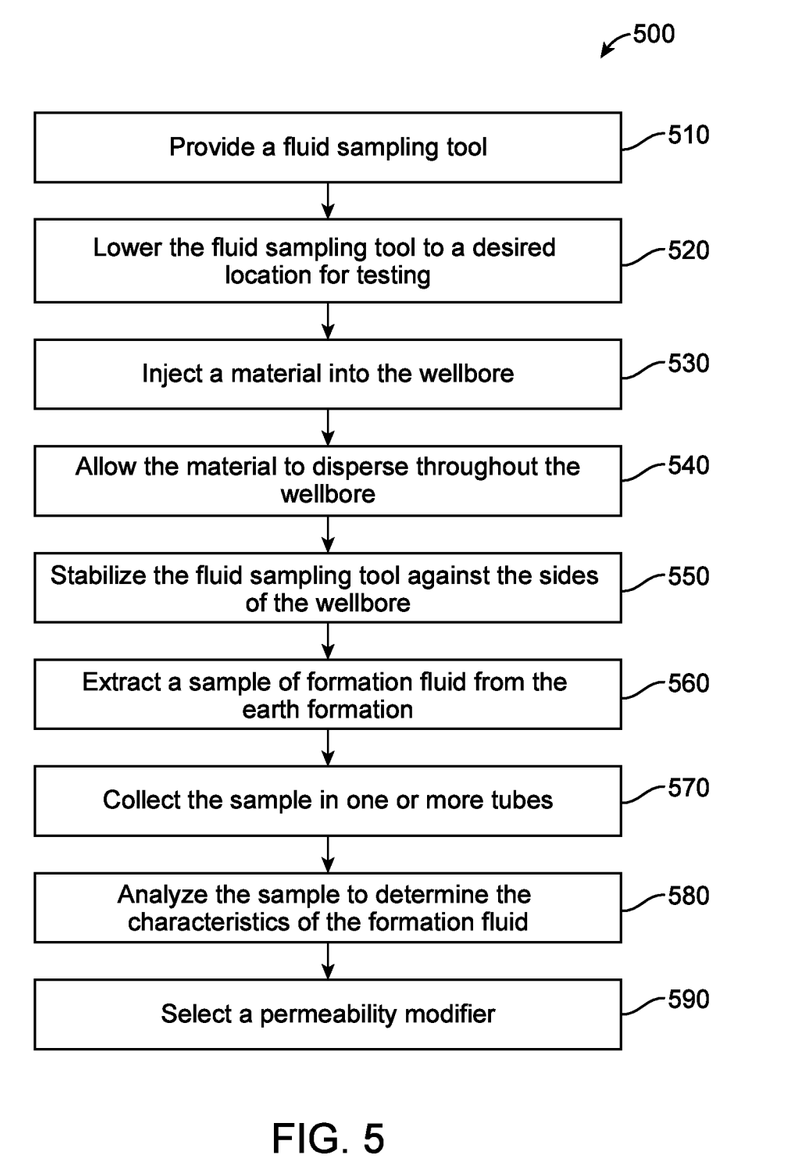
FIG. 5 is a flowchart showing a method for extracting formation fluid samples.

FIG. 5 illustrates a method 500 for selecting a SPA to be used during production based on the specific characteristics of the formation fluid present in the wellbore. At block 510, a fluid extraction tool is provided, the fluid extraction tool can have a plurality of modules, including an injection device capable of injecting a material into the annulus of the wellbore. At block 520, the fluid extraction tool is lowered into the wellbore to a predetermined depth, at which testing is desired. At block 530, a SPA is injected into the area to be tested in the wellbore. The SPA may be those described in detail above. The SPA may be held in a chamber and may be injected in a variety of forms, including, but not limited to, viscose polymer solutions, powders, nano-particles, and gels. If a polymer or polymer gel is used, the material can be, but is not limited to, a powder, a solution, or an emulsifier. The powder form of a polymer, or polymer gel, can allow for dispersion into the formation, and the absorption of water will not occur until after the powder is inside the earth formation. One example of a useful material is dried, cross-linked polyacrylamide powders (PPG), which is a super absorbent polymer capable of absorbing over one hundred times the weight of the powder in liquids and does not easily release fluid under pressure. In the alternative, polymer-coated nano-particles can be used as a displacing agent. The nano-particle size can be adjusted to obtain the desired water-permeability effect. In addition to a relative permeability modifier, the SPA can also include a trigger mechanism, such as a pH-based activator. The pH-based activator can be used to activate the relative permeability modifier when the material reaches the earth formation. At block 540, the material is allowed to disperse throughout the section of the wellbore that is being tested.

At block 550, one or more extendible supports and one or more extendable sealing pads are extended out from the body of the fluid extraction tool. The extendable appendages can stabilize the tool by pressing against the inner surface of the wellbore such that the sealing pad seals off the section of the earth formation to be tested. At block 560, a pump within the formation tester extracts a sample of formation fluid from the earth formation and draws the sample into the recess within the sealing pad. Initially, the extracted sample may contain a large amount of permeability modifier, as well as water-based mud filtrate. The contaminated portion of the sample can be discarded through an outlet port in the formation tester. As fluid is continually extracted from the earth formation, the sample will become less contaminated. A high-resolution stain-gauge can be included near the entrance to the fluid flow tube allowing for a quick initial analysis of the material to determine if contamination is present. If contamination continues, various components can be used to separate the permeability modifier contamination from the formation fluid sample. For example, a polymer coated magnetic nano-particle can be placed in the dispersed material, a density disparity can allow for gravitational segregation, or a centrifuge may be used to separate the sample. In the alternative, some permeability modifiers can block filtrate flow, allowing for a clean oil sample to be collected from the start. At block 570, the clean formation fluid sample is collected in one or more sample tubes within the tool.

At block 580 the mobility of the hydrocarbon phase in the formation can be determined. The analysis can be done by a sensor housed within the formation tester as the fluid is drawn from the formation through the extendable sealing pads according to block 560 or sensor within the fluid test module, as described above. The sensor can conduct a mobility assessment on fluids taken, for the purposes of this example, from non-fractured reservoirs.

The fluid mobility of a multi-fluid scenario is not very informative of a hydrocarbon portion or phase. Accordingly, as disclosed herein by use of the SPAs, the determination of the mobility of hydrocarbons within the formation can be isolated to some degree. This can be shown in the following. Total mobility for a three-phase flow system can be determined by Equation 1.

$$\lambda_t = \frac{k_{oil}}{\mu_{oil}} + \frac{k_{gas}}{\mu_{gas}} + \frac{k_{water}}{\mu_{water}} \quad (1)$$

In the alternative, where gas is a minor (or negligible) factor, it can be removed from the equation.

In such cases, the total mobility of an oil-water two-phase flow scenario can be defined by Equation 2.

$$\lambda_t = \frac{k_{oil}}{\mu_{oil}} + \frac{k_{water}}{\mu_{water}} \quad (2)$$

The use of a relative permeability modifier, such as those described above, in the extraction process can suppress the mobility of water, without negatively affecting oil mobility. Thus, when a permeability modifier is used during extraction, the liquid hydrocarbon phase mobility can be approximated by Equation 3.

$$\lambda_t \rightarrow \lambda_{oil} = \frac{k_{oil}}{\mu_{oil}} \quad (3)$$

In some cases where the gas phase is primarily hydrocarbon, then both the liquid and gas phases of the hydrocarbon phase can be determined.

The above method can be used for a variety of purposes, including improving the quality of formation fluid samples collected and determination of mobility of the hydrocarbon phase in the formation. At block 590, a preferred permeability modifier is selected based on the properties of the formation fluid present. The injection of a permeability modifier into wellbore formations, such as transition zones, high water-cut reservoirs, and fracture reservoirs allows for the extraction of a less contaminated sample.

In an alternative example, a mobility assessment as described above can be conducted in a naturally fractured reservoir. For example, the pore systems of fractured reservoir rocks can be treated as a dual-porosity, or dual-permeability, system. The fractures can be viewed as fissure pores and the remaining porosity consists of matrix pores. For naturally fractured reservoir rocks, the measure of total mobility of a fluid sample is dominated by the mobility of the fractures, especially if the fractures are well connected. The permeability of the rock matrix is significantly lower than that of the fractures, thus the mobility of the hydrocarbons stored in matrix pores may not be assessed correctly in the total mobility calculation. However, a permeability modifier injection prior to mobility testing can significantly impede the flow in the fractures. For example, an RPM such as a super water-absorbent polymer gel can effectively crosslink within the fractures to hinder flow causing the dual-porosity system to act like a single porosity system. Specifically, the permeability modifier can form an internal cake along the fractures, blocking fluid flow and allowing formation drawdown pressure measurements to yield a hydrocarbon phase mobility extremely similar to the true matrix mobility.

In the alternative, the method can be used in mature wellbores. Mature wellbores are typically unable to produce hydrocarbons in quantities allowing for profit, and are thus left as residual oil saturation within the earth formation. Injecting a permeability modifier into the formation can allow for hydrocarbon-heavy samples to be extracted in areas where they were previously unattainable.

In sampling a mature reservoir, designing a successful permeability modifier flooding program is critical to the ultimate production and enhanced oil recovery (EOR). Typically, numerical simulations, or laboratory core flooding experiments, are used in order to predict the outcome and in selecting the permeability formula. An in-situ field pilot program using an injection and production well is significantly more costly and time consuming. Using the method described in FIG. 5, a small scale, in-situ test can be performed in a shorter period of time, and can provide the initial EOR oil production data in actual reservoir conditions. Such data once obtained can be fed into a reservoir simulator to help designing the EOR strategy.

Numerous examples are provided herein to enhance understanding of the present disclosure. A specific set of statements are provided as follows.

Statement 1: A method for obtaining formation fluid samples, the method comprising disposing a fluid extraction tool into a wellbore extending through a subterranean earth formation; injecting, from the fluid extraction tool, a selective permeability agent into the wellbore at a predetermined depth; and extracting, from the earth formation, a sample of a formation fluid.

Statement 2: A method according to Statement 1, wherein extracting the sample of the formation fluid comprises extending a sealing pad from a portion of a body of the fluid extraction tool, the sealing pad having at least one opening for establishing fluidic communication between the earth formation and the interior of the body, the sealing pad having an outer surface to hydraulically seal a region along an inner surface of the wellbore and at least one recess within the outer surface of the sealing pad, the at least one recess establishing a fluid flow channel along the inner surface of the wellbore sealed off by the sealing pad, and extracting the formation fluid from the subterranean earth formation through the at least one opening.

Statement 3: A method according to Statement 1 or Statement 2, wherein injecting comprises injecting the selective permeability agent through the at least one opening of the sealing pad which serves as an outlet.

Statement 4: A method according to Statements 1-3, wherein injecting comprises injecting the selective permeability agent into the subterranean earth formation from an opening other than the at least one opening of the sealing pad.

Statement 5: A method according to Statements 1-4, further comprising containing the selective permeability agent in a chamber disposed within the extraction tool.

Statement 6: A method according to Statements 1-5, further comprising testing the formation fluid mobility via a formation fluid mobility testing sensor.

Statement 7: A method according to Statements 1-6, further comprising testing the mobility of the formation fluid being extracted.

Statement 8: A method according to Statements 1-7, further comprising holding the extracted formation fluid in a sample collection chamber.

Statement 9: A method according to Statements 1-8, further comprising selecting the selective permeability agent from the group consisting of a disproportionate permeability reducer, a relative permeability modifier, a formation fluid mobility modifier, and mixtures thereof.

Statement 10: A method according to Statements 1-9, further comprising selecting the selective permeability agent comprising polyacrylamide.

Statement 11: A system comprising a fluid extraction tool disposed in a wellbore comprising a body; a sealing pad extending from a portion of the body, the sealing pad having at least one opening for establishing fluidic communication between an earth formation and the interior of the body, the sealing pad having an outer surface to hydraulically seal a region along an inner surface of a wellbore and at least one recess within the outer surface of the sealing pad, the at least one recess establishing a fluid flow channel along the inner surface of the wellbore sealed off by the sealing pad; a container holding a selective permeability agent; a processor communicatively coupled with the fluid extraction tool, the processor comprising a memory storing instructions that, when executed by the processor, cause the processor to perform operations comprising pumping, from the fluid extraction tool, the selective permeability agent into the wellbore at a predetermined depth, extracting, from the earth formation, a sample of a formation fluid.

Statement 12: A system according to Statement 11, wherein the memory storing further instructions that, when executed by the processor, cause the processor to perform operations further comprising analyzing, at a sensor, a formation fluid mobility for the formation.

Statement 13: A system according to Statement 11 or Statement 12, further comprising a display communicatively coupled with the processor and rendering the analysis.

Statement 14: A system according to Statements 11-13, wherein the selective permeability agent is selected from the group consisting of a disproportionate permeability reducer, a relative permeability modifier, a formation fluid mobility modifier, and mixtures thereof.

Statement 15: A system according to Statements 11-14, wherein the selective permeability agent comprises polyacrylamide.

Statement 16: A fluid extraction tool comprising a body; a sealing pad extending from a portion of the body, the sealing pad having at least one opening for establishing fluidic communication between an earth formation and the interior of the body, the sealing pad having an outer surface to hydraulically seal a region along an inner surface of a wellbore and at least one recess within the outer surface of the sealing pad, the at least one recess establishing a fluid flow channel along the inner surface of the wellbore sealed off by the sealing pad; a container holding a selective permeability agent; one or more devices for injecting the selective permeability agent through at least one outlet of the body into the earth formation, and extracting a formation fluid through the at least one opening into the body, wherein the formation fluid being collected is from the region along the inner surface of the wellbore sealed off by the sealing pad.

Statement 17: A fluid extraction tool according to Statement 16, wherein the one or more devices comprises one or more pumps.

Statement 18: A fluid extraction tool according to Statement 16 or Statement 17: wherein the at least one opening of the sealing pad serves as the at least one outlet of the body through which the selective permeability agent is injected into the earth formation.

Statement 19: A fluid extraction tool according to Statements 16-18, wherein the selective permeability agent is selected from the group consisting of a disproportionate permeability reducer, a relative permeability modifier, a formation fluid mobility modifier, and mixtures thereof.

Statement 20: A fluid extraction tool according to Statements 16-19, wherein the selective permeability agent comprises polyacrylamide.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

What is claimed is:

1. A method for testing fluid mobility within a formation comprising:

disposing a tool into a wellbore extending through a subterranean earth formation, the tool having a flow line;

injecting, from the tool, a permeability modifying agent into the subterranean earth formation at a sample area, wherein the permeability modifying agent reduces a flow of water while permitting a flow of hydrocarbons into the flow line;

measuring a pressure of the hydrocarbons within the flow line in sealed fluid communication with the sample area; and determining a formation mobility based on the measured pressure of the hydrocarbons within the flow line.

2. The method of claim 1 further comprising extracting, from the sample area of the subterranean earth formation, a formation fluid into the flow line.

3. The method of claim 1, wherein measuring the pressure comprises:

extending a sealing pad from a portion of a body of the tool, the sealing pad having an opening for establishing fluidic communication between the subterranean earth formation and the flow line in an interior of the body of the fluid extraction tool, the sealing pad having an outer surface to hydraulically seal the sample area along an inner surface of the wellbore and at least one recess within the outer surface of the sealing pad, the at least one recess establishing a fluid flow channel along the inner surface of the wellbore sealed off by the sealing pad to the flow line.

4. The method of claim 1, wherein the permeability modifying agent includes one or more of a disproportionate permeability reducer, a relative permeability modifier, a formation fluid mobility modifier, and mixtures thereof.

5. The method of claim 1, wherein the permeability modifying agent is selected from a mixture that comprises an acid.

6. The method of claim 1, wherein the permeability modifying agent comprises an acid.

7. The method of claim 1, further comprising conducting an enhanced oil recovery (EOR) operation employing the permeability modifying agent.

8. The method of claim 1, wherein the formation mobility is defined as permeability (k) divided by fluid viscosity (p).

9. The method of claim 1, wherein the pressure is measured with a pressure transducer.

10. The method of claim 1 further comprising selecting a preferred permeability modifying agent based on the determined formation mobility.

11. A system comprising:
a downhole tool disposed in a wellbore comprising:
a body;
a sealing pad extending from a portion of the body, the sealing pad having at least one opening for establishing fluidic communication between an earth formation and a flow line in an interior of the body, the sealing pad having an outer surface to hydraulically seal a sample area along an inner surface of the wellbore and at least one recess within the outer surface of the sealing pad, the at least one recess establishing a fluid flow channel along the inner surface of the wellbore sealed off by the sealing pad to the flow line;
a pressure sensor in communication with the flow line;
a container holding a permeability modifying agent, wherein the permeability modifying agent reduces a flow of water while permitting a flow of hydrocarbons into the flow line;
a processor communicatively coupled with the downhole tool; and
a memory storing instructions that, when executed by the processor, cause the processor to perform operations comprising:
measuring, with a sensor, a pressure of the hydrocarbons within the flow line in fluid communication with the sample area; and
determining a formation mobility based on the measured pressure of the hydrocarbons within the flow line.

12. The system of claim 11, wherein the memory storing instructions thereon further comprises instructions that, when executed by the processor, cause the processor to perform operations further comprising extracting, from the sample area of the subterranean earth formation, a formation fluid into the flow line.

13. The system of claim 11, wherein the permeability modifying agent is selected from a mixture that comprises an acid.

14. The system of claim 11, wherein the permeability modifying agent comprises an acid.

15. The system of claim 11, wherein the formation mobility is defined as permeability (k) divided by fluid viscosity (0.

16. A downhole tool comprising:
a body;
a sealing pad extending from a portion of the body, the sealing pad having at least one opening for establishing fluidic communication between an earth formation and a flow line in an interior of the body, the sealing pad having an outer surface to hydraulically seal a sample area along an inner surface of a wellbore and at least one recess within the outer surface of the sealing pad, the at least one recess establishing a fluid flow channel along the inner surface of the wellbore sealed off by the sealing pad to the flow line;
a container holding a permeability modifying agent, wherein the permeability modifying agent reduces a flow of water while permitting a flow of hydrocarbons into the flow line;
one or more devices for injecting the permeability modifying agent through at least one outlet of the body into the sample area of the earth formation; and
a pressure sensor in communication with the flow line operable to measure a pressure of the hydrocarbons within the flow line.

17. The tool of claim 16 further comprising extracting, from the sample area of the subterranean earth formation, a formation fluid into the flow line.

18. The tool of claim 16, wherein the permeability modifying agent is selected from a mixture that comprises an acid.

19. The tool of claim 16, wherein the permeability modifying agent comprises an acid.

* * * * *